United States Patent [19]

Imamura et al.

[11] Patent Number: 5,380,392
[45] Date of Patent: Jan. 10, 1995

[54] CORE MATERIAL FOR LAMINATE AND METHOD FOR MANUFACTURING THE SAME

[75] Inventors: Nobuhiro Imamura, Kamakura; Osamu Kobayashi, Shiga; Yoshihiro Kimura, Mishima, all of Japan

[73] Assignee: Kanegafuchi Kagaku Kogyo Kabushiki Kaisha, Osaka, Japan

[21] Appl. No.: 175,190

[22] Filed: Dec. 29, 1993

Related U.S. Application Data

[62] Division of Ser. No. 15,335, Feb. 9, 1993, abandoned, which is a division of Ser. No. 790,048, Nov. 12, 1991, abandoned.

[30] Foreign Application Priority Data

Nov. 28, 1990 [JP] Japan ................................ 2-332701

[51] Int. Cl.⁶ ............................................. B32B 31/18
[52] U.S. Cl. .................................... 156/257; 156/268
[58] Field of Search ................................ 156/257, 268

[56] References Cited

U.S. PATENT DOCUMENTS

| | | | |
|---|---|---|---|
| 2,229,255 | 1/1941 | Park | 156/268 |
| 2,508,128 | 5/1950 | Waards | 156/257 |
| 2,735,426 | 2/1956 | Claydon | 156/268 |
| 3,540,967 | 11/1970 | Shook et al. | 156/519 |
| 3,841,958 | 10/1974 | Delorme | 161/161 |
| 4,536,427 | 8/1985 | Kohn | 428/44 |
| 4,568,585 | 2/1986 | Kohn | 156/268 |
| 4,887,368 | 12/1989 | Latske | 36/44 |
| 5,104,715 | 4/1992 | Cruz | 428/137 |

FOREIGN PATENT DOCUMENTS 0100231 2/1984 European Pat. Off. .
0163045 12/1985 European Pat. Off. .

*Primary Examiner*—Caleb Weston
*Attorney, Agent, or Firm*—Armstrong, Westerman, Hattori, McLeland & Naughton

[57] ABSTRACT

A core material for laminates is provided, which is formed of a substrate and a porous sheet laminated on the one side of the substrate, said substrate having slits which penetrate therethrough in rows at an appropriate interval. The core material permits no inclusion of air inside when laminated with an FRP and putty is filled in the core material, with a result that the putty not only functions as a reinforcing rib, but prevents water-containing phenomenon.

2 Claims, 6 Drawing Sheets

CORE MATERIAL FOR LAMINATE AND METHOD FOR MANUFACTURING THE SAME

This application is a division of application Ser. No. 08/015,335, filed Feb. 9, 1993, now abandoned, which was a division of application Ser. No. 07/790,048, filed Nov. 12, 1991, now abandoned.

BACKGROUND OF THE INVENTION

1. Field of the Invention

This invention relates to a core material for laminates and a method for manufacturing the same, more specifically, it relates to a core material for giving a laminate which is light in weight and excellent in strength by being laminated with an FRP or the like such as an unsaturated polyester, and a method for manufacturing the same.

The core material for laminates of this invention is useful for ships, boats, pools, and various tanks such as reservoirs, bath tubs and the like.

2. Description of the Prior Art

Hitherto, as for the core material of this kind, there has been used, as shown in FIG. 9 and FIG. 10, a core material 1 of crosslinked polyvinyl chloride resin foam board 2 provided with slits 4 in longitudinal and horizontal directions with a non-slit portion 3 of an appropriate length left from one side of the board 2 and laminated with porous sheet 9 on the side of the non-slit portion 3. There may be cases for the porous sheet 9 to be omitted.

In forming, for example, a hull structure having curved portions as shown in FIG. 11 by laminating such a core material 1 with an outer FRP 6 through a putty 5 and further laminating with an inside FRP 7, the core material 1 is provided in stretched state on the putty 5 along the curved configuration of the hull with rupture of the non-slit portion 3, and the putty 5 enters and is filled in the slit 4 and the ruptured portion 8 of the non-slit portion 3.

However, as the space in the ruptured portion 8 is small and its upper end is substantially closed, it is not possible to discharge air perfectly, and accordingly the putty 5 is cured under the state of sealing in air, and further the inside FRP 7 is coated on the core material 1.

As the structure like the above one contains air inside and as the putty 5 is not fully filled in spaces formed by the small pieces of the foam board 2, water which entered from the outside FRP 6 during use is pooled not only to increase the ship weight, but also to provide inconveniences including an increase in energy consumption. Further, because the putty 5 does not fully intrude into spaces formed between the small pieces of the foam board 2, the reinforcing rib effect for increasing strength is not sufficiently provided.

SUMMARY OF THE INVENTION

An object of this invention is to provide a core material for laminates in which the above problems have been solved.

Another object of this invention is to provide a method for manufacturing said core material for laminates.

Other objects and advantages of this invention are apparent to one skilled in the art from the detailed description as set forth below.

DETAILED DESCRIPTION OF THE INVENTION

This invention is, in a first aspect, to provide a core material for laminates comprising a substrate and a porous sheet laminated on one side of the substrate, said substrate having slits in rows which penetrate therethrough at an appropriate interval.

This invention is, in a second aspect, to provide a method for manufacturing a core material for laminates which comprises providing slits in rows on one side of a substrate with a non-slit portion of an appropriate length left, laminating a porous sheet on the slit side of said substrate, and further providing slits which penetrate through said slits from the opposite side of said porous sheet.

This invention is, in a third aspect, to provide a method for manufacturing a core material for laminates which comprises laminating a porous sheet on one side of a substrate and providing slits which penetrate through said substrate from the opposite side of said porous sheet without reaching said porous sheet.

This invention is explained on the basis of the drawings which show the embodiments.

Figure 1:
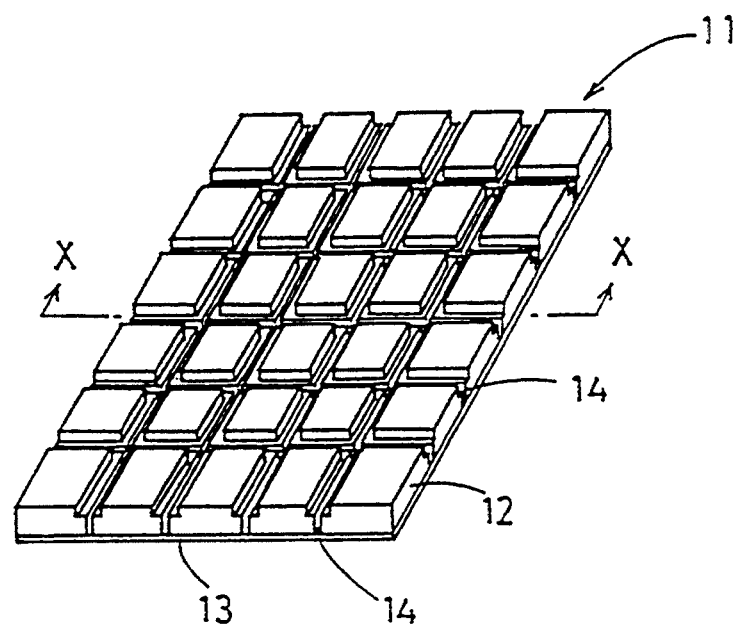
FIG. 1 is a perspective view showing an embodiment of a core material for laminates of this invention.
Figure 2:
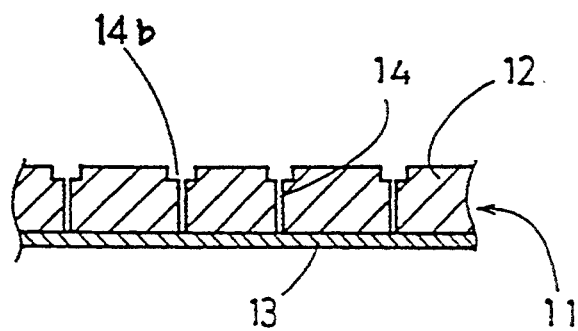
FIG. 2 is a partially enlarged sectional view taken along the line X—X in FIG. 1.

FIG. 1 is a perspective view of a core material for laminates of this invention, and FIG. 2 is a partially enlarged sectional view taken along the X—X line.

In these figures, there are shown that the core material for laminates 11 of this invention is formed so that a porous sheet 13 is laminated on one side of a substrate 12, and slits 14 which penetrate through the substrate 12 in the direction of thickness are provided longitudinally and horizontally at an appropriate distance.

As the substrate 12, a material having resilience, strength, water resistance, chemical resistance, etc. is used. Examples of such substrate are synthetic resin foam plate, a synthetic resin plate, a balsa plate, a veneer plate, a plywood, a metal plate, a ceramic plate, etc., among which the synthetic resin foam plate and the balsa plate are preferred in the point of being excellent in light weight, especially, the synthetic resin foam plate is preferred from tile point of water resistance. As the synthetic resin foam plate, there are exemplified foam plates of polyvinyl chloride resin, hard urethane resin, acryl resin, phenol resin, urea resin, etc., among which specially preferred is a foam plate of crosslinked polyvinyl chloride resin, from the points of water resistance, chemical resistance to styrene monomer or the like to be used for unsaturated polyester, flame retardant property, etc.. The thickness of the substrate is preferred in a range of from about 10 to 25 mm.

The penetrating slit 14 to be provided on the substrate 12 preferably has a width in a range of from about 0.5 to 3 mm, and its distance is suitably in a range of from about 20 to 100 mm. When the width is relatively narrow, as shown in FIG. 2, induction and filling of putty can be accelerated by providing a slit of relatively wide width 14b at the open end of the slit 14. From the aspect of adaptability to the curved surface, the slits are preferably provided in both longitudinal and horizontal rows, but depending on the place of use, the slit may be provided in one direction either longitudinally or horizontally, or obliquely.

As the porous sheet 13, the material is not specifically limited if it can pass air and retain the sheet shape without separating the small pieces of the substrate 12 sectioned with slits. Examples of such material are knitted and woven cloth, non-woven cloth, net, split cloth, porous film, etc. Preferred is a material having good wettability with an FRP, and more preferable are those formed of glass fiber or natural fiber impregnated or coated with a hot-melt adhesive, or themoplastic synthetic resin fiber having good heat-sealing property.

Figure 3:
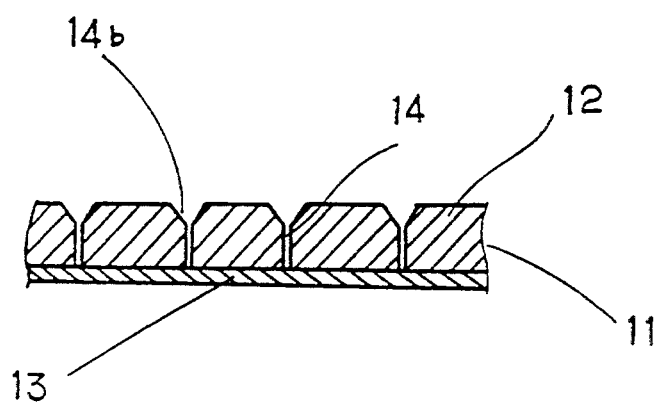
FIG. 3 is a sectional view showing another embodiment of a core material for laminates of this invention.

FIG. 3 shows other embodiment of the core material for laminates of this invention, in which, the slit 14b is formed in a tapered form to be narrowed toward the slit 14 in the core material for laminates shown in FIG. 2. By adopting such the shape, induction and filling of putty can be further accelerated.

An embodiment of the method for manufacturing the core material for laminates of this invention is explained with reference to FIG. 4 and FIG. 5.

Figure 4:
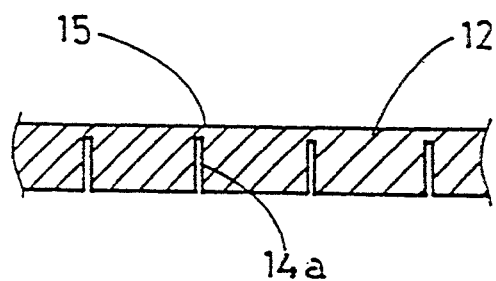
FIG. 4 is an illustrative view explaining a method for manufacturing a core material for laminates of this invention.
Figure 5:
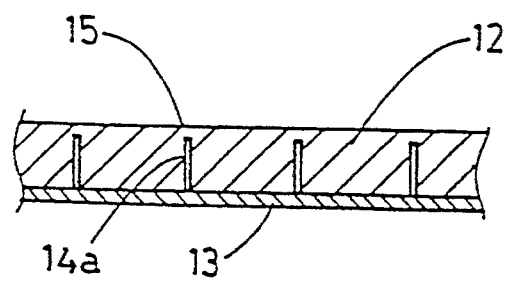
FIG. 5 is an illustrative view explaining a method for manufacturing a core material for laminates of this invention.
Figure 6:
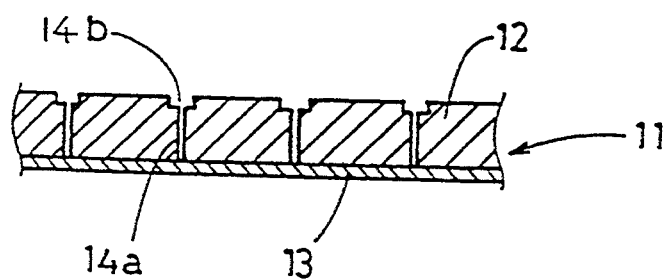
FIG. 6 is an illustrative view explaining a method for manufacturing a core material for laminates of this invention.

As shown in FIG. 4, slits 14a are provided in rows at an appropriate distance on a substrate 12 with a non-slit portion 15 left. Next, as shown in FIG. 5, a porous sheet 13 is laminated on the slit 14a side of the substrate 12. The porous sheet 13 is laminated by a hot melt adhesive, melting, welding, or the like. Subsequently, as shown in FIG. 6, a slit 14b communicating with the slit 14a is provided on the substrate 12 from the opposite side of the porous sheet 13. As a result, there is obtained a sheet-form core material for laminate 11 in which the small pieces of the substrate 12 sectioned and separated by the slits 14a and 14b are prevented from being separated into pieces by the porous sheet 13.

The slit 14 should have a depth to a degree that the substrate 12 can hold the plate-form even after provision of the slits in rows. The preferred depth is to make the depth of the non-slit portion 15 about from 1 to 5 mm. The slit 14b may have the same width as that of the slit 14a, but when the width of the slit 14b is made to be slightly wider than of the slit 14a, easy and secure communication with the slit 14a can be obtained, and additionally, there is an effect of facilitating induction and filling of putty upon laminating with an FRP, as described above.

Figure 7:
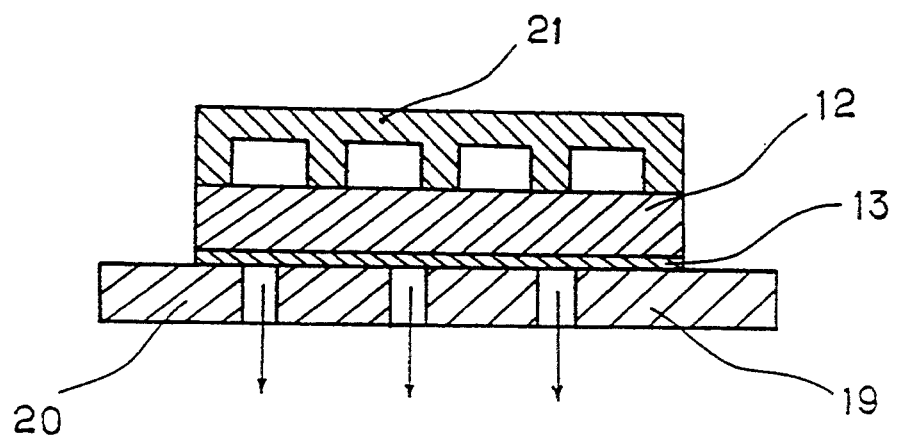
FIG. 7 is an illustrative view explaining another method for manufacturing a core material for laminates of this invention.

Another embodiment of the method for manufacturing the core material for laminates of this invention is explained based on FIG. 7. A laminate of a substrate 12 and a porous sheet 13 is placed on a fixing plate 19 having a highly smoothed surface and a suction hole 20 connected to the vacuum apparatus (not shown). While pressing said laminate with a pressing instrument 21 from above and sucking it through the suction hole 20, with the porous sheet 13 of laminate kept horizontal, slits penetrating through the substrate 12 are provided by using a revolving saw having good precision 12 or the like with attention paid so as not to reach said porous sheet 13 to thereby give a core material for laminates as shown in FIG. 2 or FIG. 3.

The core material for laminate as described above is laminated with various FRPs. The FRP resin is not specifically limited and includes unsaturated polyester, epoxy, urethane, etc. The reinforcing fiber is not specifically limited, including glass fiber, carbon fiber, and the like.

Figure 8:
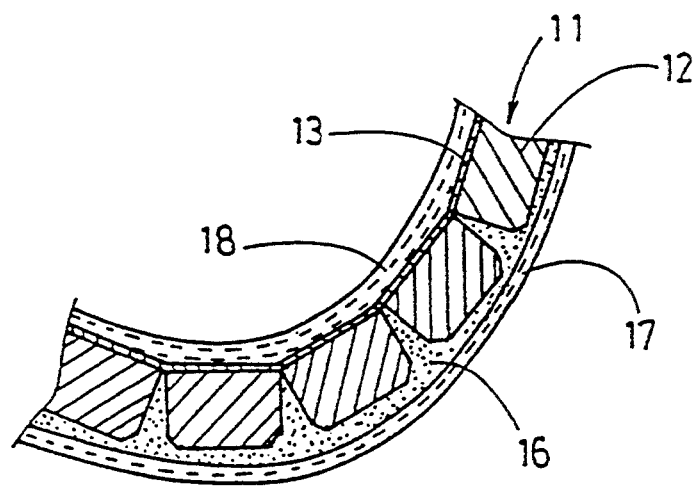
FIG. 8 is a schematic sectional view showing an FRP laminate using a core material for laminates of this invention.
Figure 9:
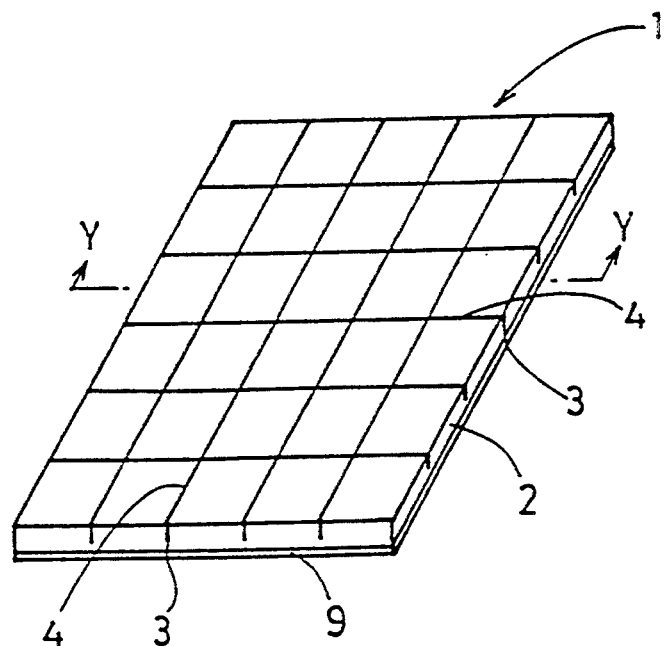
FIG. 9 is a perspective view showing a conventional core material for laminates.
Figure 10:
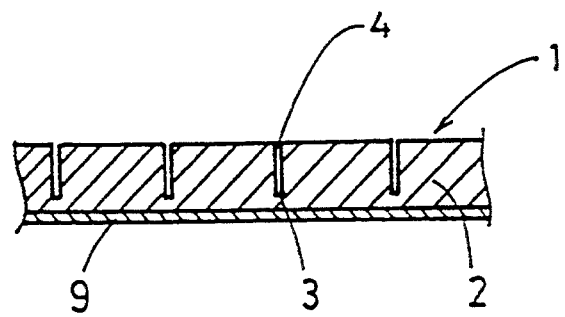
FIG. 10 is a partially sectional view taken along the line Y—Y in FIG. 9.
Figure 11:
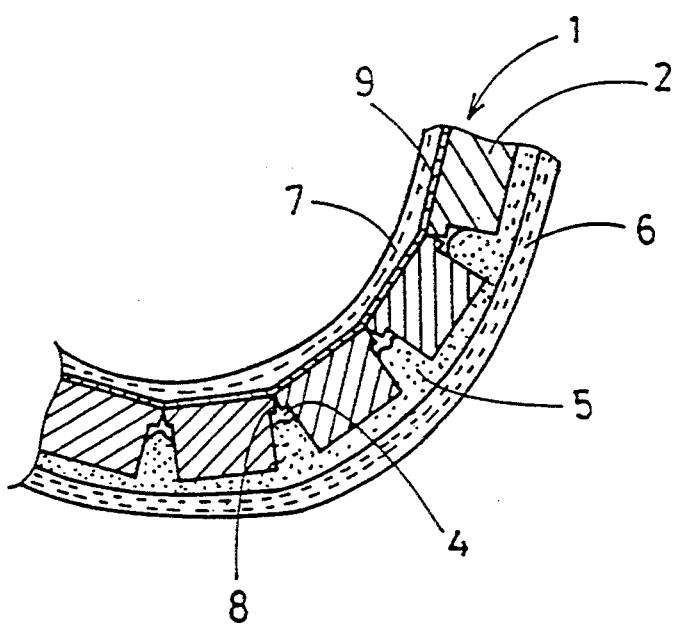
FIG. 11 is a schematic sectional view showing an FRP laminate using a conventional core material for laminates.

In FIG. 8, there is shown an example of laminating with the FRP 17 and 18 using the core material for laminate as shown in FIG. 3, wherein air in spaces formed between the small pieces of the substrate 12 is chased out through the porous sheet 13 and the putty 16 is filled in spaces formed between the small pieces, with the result that the water-retaining phenomenon in the laminate structure is prevented, and the putty 16 plays a role of a reinforcing rib to give a remarkable improvement in strength.

Hereinafter, the invention is explained in more detail by way of examples, but it is in no way limited to these examples.

On one side of a crosslinked polyvinyl chloride foam board having a size of 910 mm × 810 mm and a thickness of 20 mm (made by Kanegafuchi Chemical Industry Co., Ltd., registered trademark "Klegecell 75") 12, as a substrate, there were provided in rows longitudinally and horizontally slits 14a having 16 mm depth and 1 mm width [non-slit portion 15 being 4 mm] at 50 mm intervals, using a slitter provided with a large number of round saws having a blade width of 1 mm (FIG. 4).

Next, a hot melt adhesive was coated on the surface of the slit 14a of the above foam board 12, on which a glass cloth 13 made by knitting about 0.5 mm glass yarn having a coarseness of about 5 mm was placed. From above the glass cloth 13, an iron plate heated to about 120° C. was applied for about 5 seconds to melt the hot melt adhesive to bond the glass cloth 13 to the crosslinked polyvinyl chloride foam plate 12 (FIG. 5).

Thereafter, using a slitter provided with a large number of round saws having blade width of 3 mm at a distance of 50 mm, slits having a depth of 5 mm and a width of 3 mm 14b were provided in rows longitudinally and horizontally at an interval of 50 mm in such a manner as to communicate with the slits 14a from the surface of the opposite side of the glass cloth 13 to thus give the core material 11 of this invention (FIG. 6).

As described above, the core material for laminates of this invention does not contain air inside when laminated with an FRP. Accordingly, the putty is filled the core material to prevent water-containing phenomenon which has been the defect of the conventional core material. Further, the so filled putty functions as the reinforcing rib, so that the strength of the laminate can be greatly improved.

What is claimed is:

1. A method for manufacturing a core material for laminates which comprises the following steps:

placing a laminate comprising a substrate and a porous sheet on a fixing plate having a smooth surface and a suction hole connected to a vacuum apparatus, such that the porous sheet is in contact with said fixing plate, pressing the laminate against the fixing plate with a pressing instrument from above and providing suction through the suction hole so as to keep the porous sheet of the laminate horizontal, cutting a plurality of parallel slits penetrating through the substrate using a revolving saw so as not to cut the porous sheet.

2. The method of claim 1, wherein said slits are wider at an open end of the slit in order to accelerate filling of putty thereinto.

* * * * *